United States Patent [19]

Johnson, Jr. et al.

[11] 4,302,134
[45] Nov. 24, 1981

[54] CAPTURING ARTICLES EJECTED FROM A CARRIER AND REDIRECTING SUCH ARTICLES

[75] Inventors: Anderson F. Johnson, Jr., Sinking Spring; Fred J. Reinhard, Whitfield Reading, both of Pa.

[73] Assignee: Western Electric Co., Inc., New York, N.Y.

[21] Appl. No.: 153,103

[22] Filed: May 23, 1980

[51] Int. Cl.³ .............................................. B65G 51/02
[52] U.S. Cl. ..................................... 406/51; 209/573; 209/644; 198/484; 198/493; 198/690; 406/93; 406/108
[58] Field of Search ....................... 406/51, 62, 68, 76, 406/93, 94, 95, 108, 153; 209/573, 574, 644; 198/480, 484, 493, 690

[56] References Cited

U.S. PATENT DOCUMENTS

| | | | |
|---|---|---|---|
| 2,993,737 | 7/1961 | Stephen | 406/93 X |
| 3,034,645 | 5/1962 | Groppe . | |
| 3,485,357 | 12/1969 | Payne | 198/493 X |
| 3,581,889 | 6/1971 | Abraham et al. . | |
| 3,581,890 | 6/1971 | Demuzio et al. | 209/573 |
| 3,674,141 | 7/1972 | Abraham et al. . | |
| 3,799,216 | 3/1974 | Kopczynski . | |
| 3,810,540 | 5/1974 | Georges | 209/573 X |
| 3,875,978 | 4/1975 | Kopczynski . | |
| 3,924,900 | 12/1975 | Eisenlohr | 406/68 |
| 3,957,152 | 5/1976 | Heitmann | 198/480 |

OTHER PUBLICATIONS

Western Electric Technical Digest No. 22; "Lead Tinning Machine" by Blewett et al.; pp. 7-8; 4-1971.

*Primary Examiner*—Jeffrey V. Nase
*Attorney, Agent, or Firm*—D. C. Watson; G. W. Houseweart

[57] ABSTRACT

A mechanism 30 ejects an article 12 in an ascending path from a position 10 on a carrier wheel 20. An inverted "V" shaped trough 43 is located to face the ascendent path of the article 12, and to be oriented substantially parallel thereto. The article 12 is captured and removably held in an apex portion 49 of the trough 43 by an elongated magnet 56 which establishes a force field parallel to such trough 43, concentrating in the apex portion 49. The article 12 is also oriented by magnet 56 and the apex portion 49 of trough 43 in a desired direction. An air nozzle 60 has a needle-like tube 64 disposed in the apex portion 49 ending adjacent to a body 16 of an article 12. A hose fitting 66 is attached to tube 64 for introducing an air stream therein which impinges upon body 16 and propels article 12 in the desired direction.

14 Claims, 2 Drawing Figures

CAPTURING ARTICLES EJECTED FROM A CARRIER AND REDIRECTING SUCH ARTICLES

TECHNICAL FIELD

This invention relates to capturing elongated articles ejected from a carrier and redirecting such articles to a desired location. More particularly, the invention relates to testing axially leaded diodes on a wheel, wherein it is desirable to eject unacceptable diodes in an ascending path, capture such diodes with a given orientation and propel them into a transport tube which guides and redirects them to a desired location.

BACKGROUND OF THE INVENTION

Elongated electrical articles, such as axially leaded diodes are generally tested after they are fully assembled and before they are packaged for shipment. Typically, these diodes have a central, cylindrical body with two wire-like leads extending in longitudinally opposite directions from such body. Quite often the diodes are packaged for shipment by adhering the leads thereof to tape and then winding the tape on a reel. Typically, such taping takes place by carrying the diodes in a closely spaced, parallel relationship on the periphery of a carrier wheel and by manipulating the tape such that it contacts a rather large portion of the periphery so that good adherence of the diodes to the tape is achieved. Typically, the wheel is loaded at a top portion and the taping typically takes place along a lower portion of the wheel.

It is advantageous to test the diodes on the same wheel which is used for taping to make certain each diode is electrically acceptable just before it is adhered to the tape. However, with the tape contacting the lower portion of the wheel, it becomes appropriate to do the testing and subsequent operations along the upper periphery of the wheel. Therefore, as the wheel rotates toward the tape, each diode is electrically tested and an unacceptable diode, for example, one having the wrong polarity is removed and replaced. Heretofore, it is believed that such replacement has generally been done on a manual basis, often with the wheel being stopped for this purpose. Now, a desire to enhance the speed of diode handling has inspired a search for automatic removal and replacement of an unacceptable diode without interrupting the testing and taping functions.

It is known to remove a diode from a wheel by automatically ejecting it from its position thereon. The problem is to properly capture a diode when it is ejected in an ascending path and to do so with proper orientation of the diode and with redirection to a desired location, preferably at a high rate of speed. Heretofore, it has been customary to eject or deflect such a diode from the lower part of a wheel so that the force of gravity works for and not against the capture of the diode.

SUMMARY OF THE INVENTION

In view of the foregoing, it is an object of this invention to provide improved apparatus and methods for capturing an elongated article from a carrier and redirecting such article.

With this and other objects in mind, the present invention includes means for ejecting an article in an ascendent path from a position on a carrier, such as a testing and taping wheel. A trough is located in the path of the article, facing the article position and oriented substantially parallel thereto, for capturing the ejected article in the trough. Means are provided for removably holding the article in the trough such that the article is oriented in a desired direction and other means propel the oriented article from the trough in the desired direction.

In a disclosed embodiment, the trough is substantially "V" shaped in cross-section with the open portion of the "V" facing the article position such that the sloped sides of the trough tend to guide the ejected article into the apex portion of the trough. Such trough has an open first end from which an article is propelled and a second end, there being sufficient distance between such ends to receive the length of the article.

In one embodiment, adapted for handling magnetic articles, an elongated magnet advantageously is disposed adjacent to the external surface of the trough along the apex portion thereof. Each end of the magnet is of opposite polarity so lines of flux are generated parallel to the trough, concentrating in and along the apex portion thereof.

In a further embodiment, adapted for handling elongated articles having a generally central body with a first and second lead extending coaxially therefrom, a filler material is adherently applied in and along a part of the trough at the second end thereof. When an article is captured in the trough the second lead uniformly contacts such filler material and the body rests in the apex portion of the trough to properly orient the article therein. In a further improvement, an air tube is located in the apex portion of the trough, embedded in the filler material, such tube ending adjacent to the upper part of a body of an article held therein. Air supply means applied to the tube permit a stream of air to impinge upon the body and thereby propel the article in a desired direction.

In a specific embodiment for capturing an elongated magnetic article ejected from a carrier, a specific magnetic field is established within the apex portion of the trough in a lengthwise and concentrated manner. The field is of sufficient strength relative to the weight and material of an article to hold it under predetermined ejection conditions while permitting release of such article upon predetermined propelling forces.

BRIEF DESCRIPTION OF THE DRAWING

The above-described and other objects, advantages and features of the invention will be more readily understood from the following detailed description when read in conjunction with the accompanying drawing, wherein.

Figure 1:
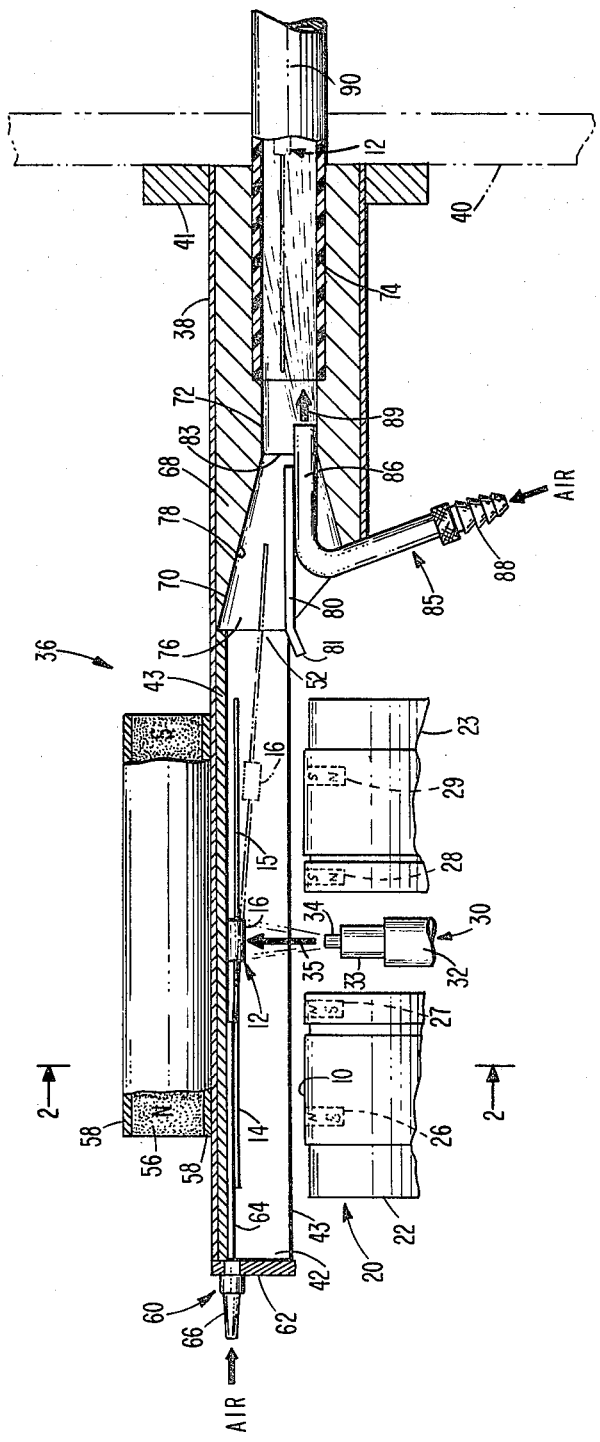
FIG. 1 is a longitudinal cross-sectional view of one embodiment of apparatus in accordance with the invention disposed in juxtaposition with a typical transport wheel from which articles are to be captured and redirected.

It can be seen that certain elements in the figures are cut away or simplified to highlight certain features of the invention. Also, where appropriate, reference numerals have been repeated in the figures to designate the same or corresponding features in the drawing.

DETAILED DESCRIPTION

The Elongated Articles

In FIG. 1 there is shown an elongated article 12 which has been captured for redirecting. For purposes of illustration, the article 12 will often be identified and referred to as an axially leaded diode 12. However, it will be appreciated that other elongated articles 12, such as, without limitation, resistors, capacitors, or varistors, can as well be handled in the practice of the invention.

Referring again to FIG. 1, the diode 12 is seen to have wire-like leads 14 and 15 extending in opposite directions from a generally central body 16. In an illustrative example, which will be used hereinafter unless otherwise specified, a typical diode 12 will be assumed to be about 3.375 inches long and weigh about 0.243 grams. Each lead 14 or 15 is about 0.020 inches in diameter and about 1.563 inches long. The body 16 is cylindrical in shape, being about 0.120 inches in diameter and about 0.250 inches long.

The body 16 contains an electronic device (not shown) which has a cathode connected to one external lead such as lead 14 and, in this example, an anode connected to the other external lead 15. The diode 12 is thus directionally sensitive from a polarity standpoint although such polarity typically cannot be discerned by visual observation of the shape of the diode 12.

The leads 14 and 15 and parts of diode 12 within the body 16 are made of a magnetic material, i.e., a material which is attracted to a magnet. Therefore, the diode 12 is affected by magnetic forces and magnetic means are advantageously used to manipulate such diodes.

Carrying, Testing, and Ejecting Articles

Referring again of FIG. 1, there is shown a portion of a typical carrier, in this case a portion of a vertically disposed wheel 20 for carrying diodes 12 for testing and taping. Wheel 20 has two sections 22 and 23 which perform the function of holding diodes 12 in predetermined positions which are here designated as nests 10. Each nest 10 is grooved (not shown) to accommodate the leads 14 and 15 of diode 12 and thereby to support such diodes in the nests 10. The nests 10, and therefore the diodes 12, are typically spaced about 0.200 inches center-to-center in parallel relationship, both to each other and to the axle (not shown) of the wheel 20.

When the diodes 12 are loaded onto the wheel 20 for testing before taping, the leads 14 and 15 have generally been straightened to a nearly collinear condition with respect to each other and to the centerline of the body 16. The leads of each diode 12 are, therefore, in substantially uniform contact with the periphery of the wheel within the nests 10 and the body 16 is suspended between wheel sections 22 and 23.

It has been found advantageous in handling diodes 12 by use of the typical carrier wheel 20 to drive the wheel at a uniform speed which is conducive to proper testing and taping. Various means are available for loading the wheel properly, especially when holding magnets, for example, pin magnets 26, 27, 28, and 29, are provided for each diode 12 at each nesting position 10. Magnets 26–29 are further useful in holding the diodes 12 on the wheel 20 until such diodes are fully adhered to the tape, particularly when the taping is done along the lower section of the vertically disposed wheel 20.

Between wheel sections 22 and 23 there is located an ejector mechanism designated generally by the numeral 30. The ejector mechanism 30 is stationary at a selected location and is typically oriented in a direction extending radially outward from the center of the wheel 20.

In a typical taping operation, it is desirable to load diodes 12 onto the wheel 20 as it rotates upward and to test the diodes 12 along the top of the wheel, before taping begins. Some diodes 12 are found unacceptable after testing, for example, because of reversed polarity, so they are to be removed and redirected to storage or to a bin which feeds diodes onto wheel 20. Therefore, the ejector 30 shown in FIG. 1, is shown in a typical, vertically upright position after testing. However, it is to be understood for the purposes of this disclosure that ejecting may also take place in a non-vertical manner and at any convenient location which is not allocated for taping or other operations.

Ejector 30 is an air cylinder 32 which is only partially shown and a piston which includes a lower, wider section 33 and an upper, narrower section 34. Section 34 is purposely made of reduced diameter so that it may travel upward to strike a body 16 of a diode 12 without striking an adjacent body of another diode. When a test station (not shown) determines that a diode 12 is unacceptable, a signal is transmitted with appropriate time delay so that the ejector 30 is actuated and strikes the unacceptable diode 12 when it is approximately aligned with the piston section 34. The diode 12 is so oriented that section 34 strikes as close to the balance point of diode 12 as is feasible. Ideally, the ejected diode moves in an ascending path designated by the arrow 35 while at all times remaining uniformly parallel to the nest 10. From a practical standpoint, the diodes 12 are not always precisely balanced about the piston section 34 and non-uniform movement of an ascending diode is to be expected in capturing an ejected diode.

Capturing and Removably Holding Articles

Referring again to FIG. 1, a trough holder assembly, designated generally by the numeral 36, is located in the path of an ascendent diode 12. Assembly 36 is advantageously supported by a hollow tubular member 38 which is attached by a flange 41 to a support panel 40 and member 38 extends therefrom to an end 42 located beyond wheel 20. Member 38 and many parts of assembly 36 are preferably made of a non-magnetic material such as type 316 stainless steel for reasons which will be explained hereinafter.

Figure 2:
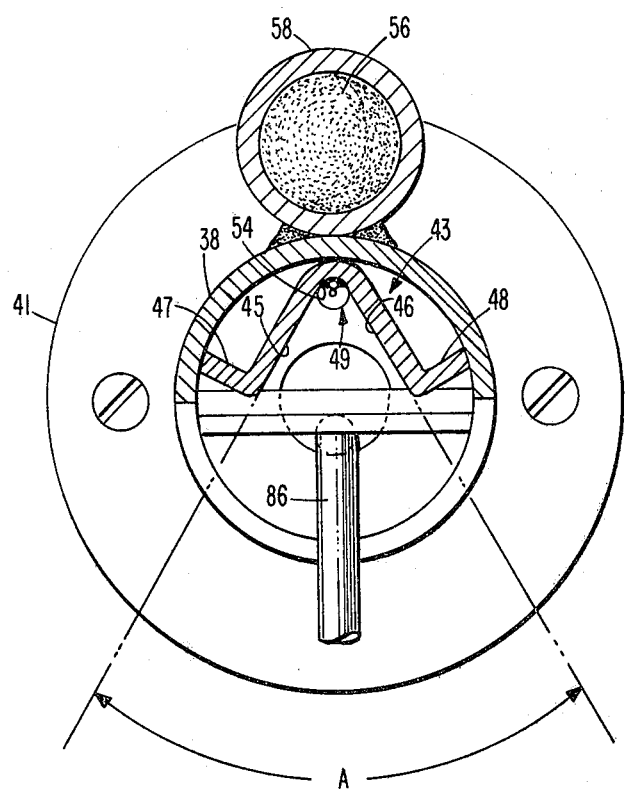
FIG. 2 is a cross-sectional view taken along line 2—2 in FIG. 1.

The portion of member 38 which faces the wheel 20 is cut out along the bottom to receive an inverted "V" shaped trough designated generally by the numeral 43, as shown more clearly in FIG. 2. Trough 43 has two sloped sides 45 and 46 which are supported, respectively, by two legs 47 and 48 extending to the tubular member 38. The sloped sides 45 and 46 of trough 43 tend to guide an ejected diode 12 into an apex portion designated generally by the numeral 49. The shape of apex portion 49 is made to fit the shape of a body 16 of a diode 12. Also, the sides 45 and 46 define an included angle "A" which may be made larger or smaller than is shown to effectively entrain an ejected diode 12 from wheel 20 under trough 43. It will be appreciated that the inverted "V" shaped trough 43 need not face directly downward; for example, if the ascendent path of an article 12 is not vertical, the trough 43 advantageously is positioned so the "V" shape is aligned with the ascendent path of the article 12.

The trough 43 is oriented so that apex portion 49 is substantially parallel to an article position 10 on the wheel 20. The trough 43 has an open first end 52 from which an article 12 is propelled and a second, closed end 42, there being sufficient distance between such ends to receive the length of a given article 12. A filler material 54 advantageously is adherently applied in and along a part of the apex portion 49 extending from about where a body 16 of a captured diode 12 is held when such diode is ejected into the trough 43 to about the second end 42. The filler material 54 is applied with a thickness in said part of apex portion 49 sufficient to permit the lead 14 of diode 12 to uniformly contact such material 54 when a body 16 of a diode 12 is held in the apex portion 49. When the diode 12 is so held, the first lead 15 extends freely toward the first end 52 in a contilevered manner from the body 16.

The capture of an elongated article such as a diode 12 and the holding of a diode is further facilitated by a magnet 56 located adjacent to the trough 43. Such magnet 56 has a force field which is sufficient under the given conditions to hold a diode 12 in the apex portion 49 so that orientation of the diode therealong is maintained and the diode does not fall out or become shifted. The magnet 56 is enclosed within a holding tube 58 which is made of a metal compatible with and weldable to member 38 as shown in FIG. 2. Magnet 56 is preferably an elongated member which is disposed adjacent to the external surface of the trough 43 along the apex portion 49 and parallel thereto. Magnet 56 is magnetized in a lengthwise manner so that each end is of opposite magnetic polarity.

The materials for the holding tube 58, the member 38, and the trough 43 are preferably selected of non-magnetic material so that the lines of flux will essentially not permeate therein and shield the article 12 to be held in the trough 43. In the preferable arrangement shown, it has been found that flux lines are generated by magnet 56 parallel to the trough and such lines tend to concentrate in and along the apex portion 49 thereof, particularly when a magnetic article such as a diode 12 is held therein.

Propelling and Redirecting the Articles

Referring again to FIG. 1, there is seen an air nozzle designated generally by the numeral 60 which is provided to propel an oriented article 12 from the trough 43 in a desired direction. Nozzle 60 is mounted to a plate 62 covering the end 42 of trough 43. Nozzle 60 is of unique construction for an air nozzle in that is is comprised of a hose fitting 66 and a thin tube 64 which is advantageously taken from a hypodermic needle. For example, a stainless steel needle which is 0.058 inches O.D. and 0.042 inches I.D. can be used as tube 64 in handling diodes 12 described herein.

Tube 64 is disposed in and along a part of the apex portion 49 of trough 43 ending adjacent to an end of a body 16 of a diode 12 when such diode is held in the apex portion 49. Preferably the tube 64 ends adjacent to the upper part of an end of a body 16 of a diode 12 so that an air stream directed by tube 64 will propel the diode 12 in a slightly descending path as shown by the diodes 12 drawn in phantom lines. It will also be seen that tube 64 is preferably embedded in the filler material 54 to avoid having the thin, wire-like lead 14 become entangled with the tube 64.

It has been found that the stream of air directed by tube 64 in the embodiment shown in FIG. 1 maintains orientation of a diode 12 in a unique manner as the diode is propelled along and out of trough 43. It is believed that the air stream adheres to the inside surface of apex portion 49 in accordance with a phenomena known in fluid mechanics work as the "Coanda" effect. This effect is often defined as the tendency of a gas or liquid coming out of a jet to travel close to a wall contour even if such contour is not straight; for example, even if the contour leads away from the axis of the jet.

When a diode 12 is ejected into the apex portion 49 of trough 43 such diode is seized by the magnetic field created by magnet 56 and held with the desired orientation. In a timely manner air pressure is applied to nozzle 60 and a stream of air is emitted from tube 64 which impinges upon an end of a body 16 of a diode 12 and the diode is propelled thereby. It will be appreciated that the trailing lead 14 of diode 12 contacts the filler material 54 and tends to drag along such material 54 as the diode 12 exits from trough 43. It is believed that the material 54 is of relevant aid in thus keeping the diode 12 oriented as it is being propelled.

The hollow tubular member 38 also supports apparatus to receive the propelled diode 12 and to redirect it to a desired location. A machined insert member 68 fits within member 38 and is comprised of a funnel section 70, a center bore 72 and a tube socket 74. A deflection plate 80 fits within the funnel section 70 to assure that a diode 12 is directed into the center bore 72 through a passage 83. Note that the plate 80 has a bent lip 81 at funnel inlet 76 to assure that a body 16 of a diode 12 will not be caught at inlet 76 even if a slightly bent lead 14 or 15 causes improper seating in trough 43 and/or improper orientation and therefore improper directional propulsion of an article 12.

The deflection plate 80 is also useful to prevent an article 12 from being caught on redirectional propulsion means provided in insert 68. More specifically, it has been found advantageous to provide an air jet 85 to direct a stream of air according to arrow 89 through center bore 72 to enhance entry and redirectional propulsion of an article 12. The air jet 85 has a direction tube 86 (approximately 0.125 inches I.D. for example) which is inserted well within center bore 72. A hose fitting 88 is mounted to an exterior end of tube 86 to facilitate the application of air pressure thereto. It has been found that when air pressure in the range of 60 psig is applied to air jet 85, air is emitted therefrom into center bore 72 in a manner which causes an advantageous negative pressure to develop at inlet 76 of the funnel section 70. It will be appreciated that such negative pressure greatly assists entry of an article 12 into the funnel 70 and thence into the relatively narrow passage 83. Once an article has passed into the center bore it is engulfed by the air stream which expands on leaving tube 86 and substantially fills the cross-sectional area of a tube 90 which has been press fitted into socket 74. Tube 90 is preferably made of a material such as polyethylene which has a low coefficient of surface friction, and which is flexible but strong so that it will bend without crimping. When the air stream engulfs the article 12 with positive pressure in the tube 90, the consequent air stream propels the article 12 at a desired velocity which is dependent, among other things, upon the air pressure applied to air jet 85 and the capacity of the source of compressed air.

It has been known to use air powered tubes to convey elongated articles such as diodes 12. In the instant application the diodes which are to be captured and redirected usually have the wrong polarity. It is, therefore, desirable to install tube 90 so that such diodes are guided toward and deposited into a bin feeding the taping wheel 20. However, the invention is not so limited; the tube 90 can also be extended to any desired operation or storage site, such as for example to a sorting device where diodes can be collected according to shorts, opens, or reversed polarity.

It will be appreciated that there are interdependent relationships inherent in the practice of the invention which will be evident from this disclosure. For example, the strength of a magnet 56 is selected according to the material and weight of an article 12 and the conditions under which such article is ejected. The air pressure to an ejector 30 may be adjusted upward to accommodate a high rotational speed of a wheel 20 in which case the trough 43 with the magnet 56 may be moved with respect to wheel 20 to make the capture assembly 36 more effective under the predetermined ejection conditions. Furthermore, the magnetic field relates to the propelling conditions. The air pressure to nozzle 60 may be increased or decreased to facilitate release of an article 12 from the holding power of a magnet 56. Also, such magnet 56 may be positioned slightly off-center of wheel 20 depending upon the propelling conditions. For example, it may sometimes be desirable to apply air pressure on a continuous basis to nozzle 60 to stabilize noise conditions at a taping operation. Then magnet 56 is shifted slightly toward outlet end 52 to momentarily capture an article 12 in a more symmetrical condition. Under these circumstances, both the ejection and the propelling conditions tend to effect the ascending path of an article 12.

There have been illustrated herein certain practical embodiments of the invention and certain applications thereof. Nevertheless, it is to be understood that various modifications and refinements may be made and used which differ from these disclosed embodiments without departing from the spirit and scope of the present invention.

What is claimed is:

1. Apparatus for capturing an elongated article ejected from a carrier and redirecting such article, comprising:
    means for ejecting the article in an ascendent path from a position on the carrier;
    a trough located in the path of the article, continuously facing toward the article position and oriented substantially parallel thereto, for capturing the ejected article in the trough;
    means for removably holding the article in the trough such that the article is oriented parallel to a portion of a desired pathway; and
    means for propelling the oriented article along and from the trough and along the desired pathway.

2. Apparatus as in claim 1, wherein the trough is substantially "V" shaped in cross-section, the open portion of the "V" facing the article position such that the sloped sides of the trough tend to guide the ejected article into the apex portion of the "V" shaped trough, such trough having an open first end from which the article is propelled and a second end, there being sufficient distance between such ends to receive the length of the article.

3. Apparatus as in claim 2, wherein the article is magnetic and the means for removably holding the article in the apex portion of the trough further comprises:

a magnet located adjacent to the trough, having a force field of sufficient strength to removably hold the elongated article in the apex portion of the trough.

4. Apparatus as in claim 3, wherein the magnet is an elongated member disposed adjacent to the external surface of the trough along the apex portion thereof and parallel thereto, each end of such member being of opposite magnetic polarity such that lines of flux are generated parallel to the trough, such lines concentrating in and along the apex portion thereof.

5. Apparatus as in claim 4, wherein the elongated article has a generally central body with a first and a second lead extending coaxially from said body and wherein the trough further comprises:

a filler material adherently applied in and along a part of the apex portion of the trough extending from about where a body of a captured article is held when such article is ejected into the trough to about a second end of the trough, said filler material being applied for a thickness in said apex portion sufficient to permit a second lead of an article to uniformly contact such filler material when the body of the article is held in said apex portion of the trough, the first lead extending freely toward the first end of the trough in a cantilevered manner from the body of such article.

6. Apparatus as in claims 4 or 5, wherein the means for propelling the article further comprises:

a tube, located at the second end of the trough, having a first portion disposed in and along a part of the apex portion of the trough ending adjacent to a body of an article when such article is held in the apex portion of the trough; and
    means connected to a second portion of the tube and adapted for coupling a flow of a fluid into the tube and onto said body of an article for propelling such article along the desired pathway.

7. Apparatus as in claim 6, wherein the first portion of the tube ends adjacent to the upper part of a body of an article, the fluid being directed thereat, such that the article is propelled in a descending path.

8. Apparatus as in claim 7, further comprising: a transport tube to receive the propelled article therein, such tube guiding and thereby redirecting the article to a desired location; and tube entry means having a funnel opening and a deflection plate therein such that the article is propelled into the opening between the tapered funnel wall and the deflection plate; and
    air jet means located in the funnel opening and directed into the tube such that a stream of air engulfs an entered article and further propels such article at a desired velocity within the tube.

9. A method of capturing an elongated article ejected from a carrier and redirecting such article, comprising:
    ejecting the article in an ascending path from a position on the carrier;
    capturing the ejected article in a trough located in the path of the article, continuously facing toward the article position and oriented substantially parallel thereto;
    removably holding the article in the trough such that the article is oriented parallel to a portion of a desired pathway; and
    propelling the oriented article along and from the trough and along the desired pathway.

10. A method as in claim 9, wherein the article is captured in a trough having a substantially "V" shaped cross-section with the open portion of the "V" facing the article position, further comprising:

guiding the ejected article along sloped sides of the trough into an apex portion thereof, such trough having an open first end from which the article is propelled and a second end, there being sufficient distance between such ends to receive the length of the article.

11. A method as in claim 10, wherein the article is magnetic and removably holding the article in the apex portion of the trough further comprises:

establishing within the apex portion of the trough, in a lengthwise and concentrated manner, a magnetic field of sufficient strength relative to the weight and material of an article to hold such article under predetermined ejection conditions while permitting release of such article upon application of predetermined propelling forces.

12. A method as in claim 11, wherein the elongated article has a generally central body with a first and a second lead extending coaxially from said body and wherein removably holding the article further comprises:

uniformly contacting the second lead of a captured article to a filler material adheringly applied in and along a part of the apex portion of the trough from about the second end thereof to about where the body of the captured article is held in such apex portion, the first lead of such article extending freely toward the first end of the trough in a cantilevered manner from the body of such article.

13. A method as in claim 12, wherein propelling the article further comprises:

locating a tube at the second end of the trough, such tube having a first portion disposed in and along a part of the apex portion of the trough ending adjacent to the upper part of a body of an article when such article is held in the apex portion of the trough; and directing a flow of a fluid into a second portion of the tube, the fluid being carried thereby to the first portion and onto said upper part of a body of an article; and propelling such article thereby in a descending path, along the desired pathway.

14. A method as in claim 13, further comprising:

receiving the propelled article within a transport tube, such tube guiding and thereby redirecting the article to a desired location; and directing a stream of air into the transport tube to further propel such article at a desired velocity within the tube.

* * * * *